United States Patent
Hembise

(10) Patent No.: US 9,689,981 B2
(45) Date of Patent: Jun. 27, 2017

(54) INTEGRATED SYSTEM FOR COMBATING IMPROVISED EXPLOSIVE DEVICES

(75) Inventor: Dominique Hembise, Landunvez (FR)

(73) Assignee: MBDA FRANCE, Paris (FR)

( * ) Notice: Subject to any disclaimer, the term of this patent is extended or adjusted under 35 U.S.C. 154(b) by 449 days.

(21) Appl. No.: 14/004,852

(22) PCT Filed: Mar. 5, 2012

(86) PCT No.: PCT/FR2012/000077
§ 371 (c)(1),
(2), (4) Date: Nov. 25, 2013

(87) PCT Pub. No.: WO2012/123648
PCT Pub. Date: Sep. 20, 2012

(65) Prior Publication Data
US 2014/0077993 A1    Mar. 20, 2014

(30) Foreign Application Priority Data

Mar. 17, 2011    (FR) .................................. 11 00810

(51) Int. Cl.
| | |
|---|---|
| *G01S 13/88* | (2006.01) |
| *F41H 11/136* | (2011.01) |
| *F41H 13/00* | (2006.01) |
| *F42D 5/04* | (2006.01) |

(52) U.S. Cl.
CPC .......... *G01S 13/887* (2013.01); *F41H 11/136* (2013.01); *F41H 13/0068* (2013.01); *F42D 5/04* (2013.01)

(58) Field of Classification Search
CPC ...... F41H 11/136; F41H 13/0068; F42D 5/04; G01S 13/887

USPC ......................................................... 342/359
See application file for complete search history.

(56) References Cited

U.S. PATENT DOCUMENTS

| | | | |
|---|---|---|---|
| 4,053,891 | A | 10/1977 | Opitz |
| 6,163,259 | A | 12/2000 | Barsumian |
| 7,639,178 | B1 | 12/2009 | Mulbrook |
| 7,864,107 | B1 | 1/2011 | Lehtola |
| 8,681,218 | B1 * | 3/2014 | Jensen ................... G01S 7/021 342/118 |

(Continued)

FOREIGN PATENT DOCUMENTS

| | | |
|---|---|---|
| DE | 10 2006 038 627 | 2/2008 |
| WO | 2011/103066 | 8/2011 |

OTHER PUBLICATIONS

International Search Report dated Jun. 20, 2012.

*Primary Examiner* — Timothy A Brainard
(74) *Attorney, Agent, or Firm* — Dickinson Wright PLLC

(57) ABSTRACT

The system comprises an orientable block, in which are mounted at least transmission and reception antennas of means for detecting improvised explosive devices, which are directed in such a way as to illuminate at least one and the same zone of space, and a detection confirmation camera which is directed towards the zone illuminated by these transmission and reception antennas in such a way as to be able to form an image of this zone, as well as means for controlling the orientation of said orientable block, which bring about a displacement of said block in such a way as to generate a scan of a part of space by said detection means.

14 Claims, 2 Drawing Sheets

(56) References Cited

U.S. PATENT DOCUMENTS

Figure 1:
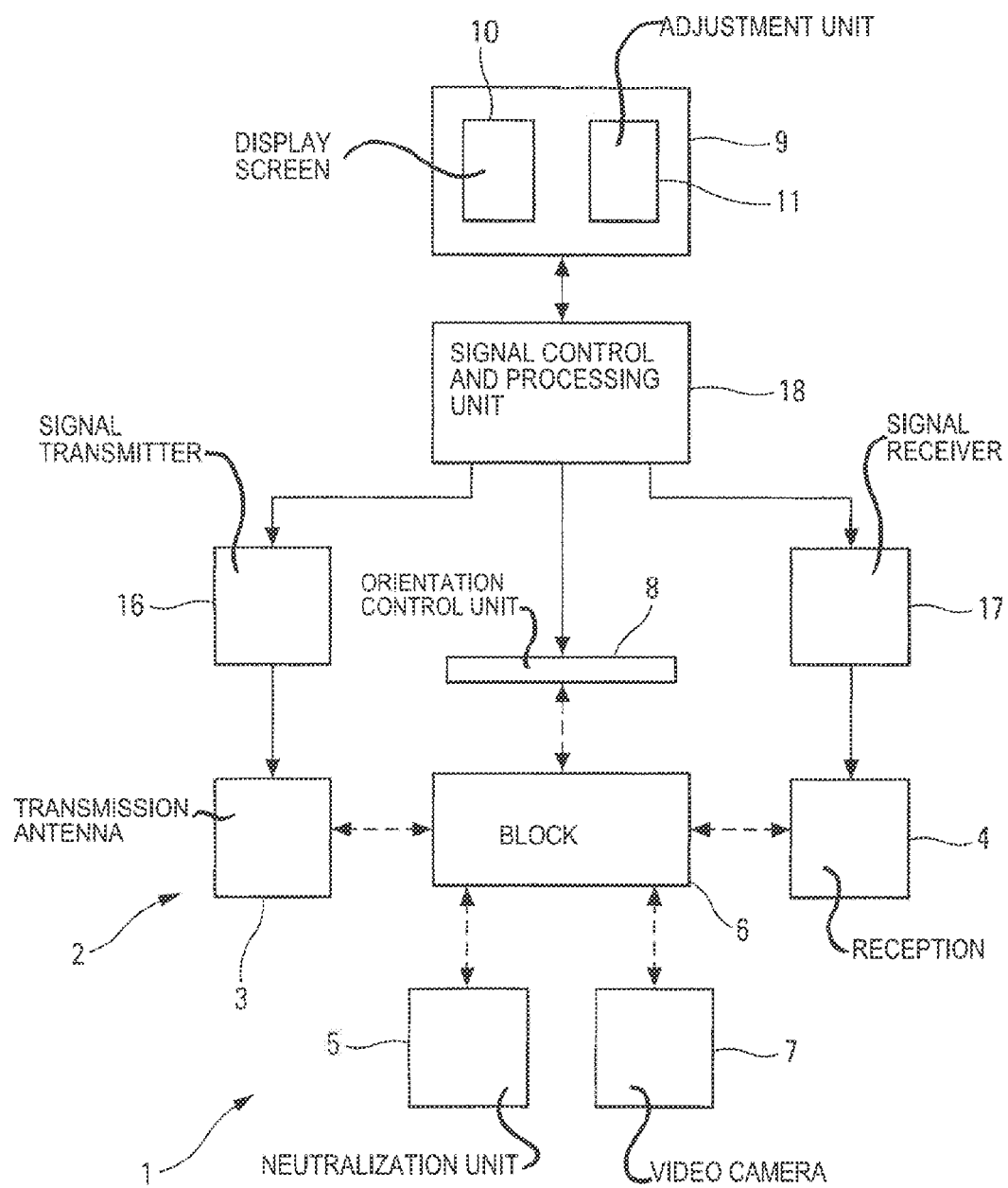

| | | | |
|---|---|---|---|
| 8,903,669 B1* | 12/2014 | Holly | G01S 7/024 |
| | | | 702/75 |
| 2008/0246619 A1* | 10/2008 | Colson | F41H 11/12 |
| | | | 340/584 |
| 2009/0107758 A1* | 4/2009 | Moore | G01N 33/227 |
| | | | 181/141 |
| 2009/0135046 A1 | 5/2009 | Steele | |
| 2009/0182525 A1* | 7/2009 | Schultz | F41H 13/0068 |
| | | | 702/127 |
| 2010/0182189 A1* | 7/2010 | Jung | F41H 11/136 |
| | | | 342/22 |
| 2010/0289686 A1 | 11/2010 | Jung | |
| 2011/0007962 A1* | 1/2011 | Johnson | G06F 17/30781 |
| | | | 382/154 |
| 2011/0084823 A1* | 4/2011 | McCarthy | G08G 1/01 |
| | | | 340/435 |

\* cited by examiner

INTEGRATED SYSTEM FOR COMBATING IMPROVISED EXPLOSIVE DEVICES

The present invention relates to an integrated system for combating improvised explosive devices.

More particularly, the present invention relates to a system for equipping a vehicle an as to give said vehicle a capacity for combating Improvised Explosive Devices (IEDs), particularly IEDs laid by terrorists in zones of armed forces interventions in overseas theatres of operations.

An improvised explosive device is a device that is positioned or manufactured in an improvised manner and that comprises explosive, incendiary or toxic chemical components. It is designed to destroy, handicap, slow down and/or distract. It can incorporate elements originating from military arsenals (for example, a grenade), but in most cases it is composed of an assembly of non-military parts. An improvised explosive device often comprises an explosive charge, a priming charge, a detonator and a firing system that is either mechanical or electronic. Numerous types of improvised explosive device exist, often assembled from miscellaneous elements.

The improvised explosive devices that are intended to reduce the mobility of troops are most often laid at the sides of a road, within a strip of less than ten metres, or are even laid or buried at a shallow depth on a road or a track used by military vehicles.

These devices are triggered by a remote radio command, but they can also comprise sensors capable of automatically activating the charge upon the passage of the target, often after a Hertzian arming command.

An integrated system for combating IEDs must have the following features in particular:
- a range of several tens of metres in order to ensure the safety of the carrier in relation to the effective radius of the charges, which is increasingly high;
- detection reliability; and
- high destruction reliability with an effect that can be observed remotely.

US 2009/0182525 discloses a system for detecting, locating and destroying improvised explosive devices. This system, the external elements of which can be mounted on a platform, is arranged underneath a helicopter in order to survey a ground zone located in front of the helicopter. The detection system comprises means for illuminating the surveyed zone by microwaves and for analysing the returned signals. In the event of the detection of returned signals, the spectrum of these returned signals needs to be analysed in order to verify the presence of improvised explosive devices. In the event of the proven presence of such a device, the orientation of the antennas used to transmit and receive the signal needs to be precisely determined in order to locate the device.

These operations for detecting, verifying and locating improvised explosive devices are relatively complicated and calculations need to be implemented in order to confirm a detection.

In addition, the following is known:
- U.S. Pat. No. 4,053,891 discloses a system for detecting and locating an object using a detector of non-linearities that are characteristic of specific objects;
- US 2010/0289686 discloses a method for disrupting or destroying a transmitter or a receiver of an improvised explosive device; and
- U.S. Pat. No. 7,864,107 discloses a system for detecting and locating an improvised explosive device.

The object of the present invention is to overcome the aforementioned disadvantages. It relates to an integrated system for combating improvised explosive devices provided with electronic components, said system comprising means for remotely detecting electronic components, provided with at least a transmission antenna and a reception antenna, as well as means for neutralising improvised explosive devices.

To this end, according to the invention, said system further comprises:
- an orientable block in which at least the following are mounted:
  - the transmission and reception antennas of said detection means, which are directed so as to illuminate a same zone of space, principally of the ground; and
  - a detection confirmation camera that is directed toward the zone illuminated by said transmission and reception antennas so as to be able to form at least one image of said zone; and
- means for controlling the orientation of said orientable block, which cause a displacement of said orientable block so as to generate a scan of part of space by said detection means.

In this way, by virtue of the invention, the confirmation of a detection can be implemented easily and simply using a confirmation camera, as specified hereinafter.

Furthermore, as the confirmation camera is directed toward the zone illuminated by said transmission and reception antennas and forms an image of this zone, it is not necessary to carry out orientation calculations and adjust the aiming of the camera in order to carry out the confirmation, which therefore can be implemented quickly. In order to increase the speed and the precision of the detection, the confirmation camera is preferably directed toward the centre of the zone illuminated by said transmission and reception antennas.

In a preferred embodiment, said system further comprises means for displaying, on a display screen, the images generated by said detection confirmation camera, and means for manually adjusting the scale of the display shown on said display screen (allowing the zoom of the displayed images to be modified). Said display screen and said adjustment means are remote from said orientable block, preferably installed inside a vehicle equipped with said system.

Advantageously, said means for controlling the orientation of said orientable block cause a displacement of said orientable block so as to obtain a scan at a constant scanning speed.

Furthermore, said detection means are advantageously formed so as to detect non-linear junctions of electronic components. In a preferred embodiment, said detection means comprise:
- a signal transmitter capable of transmitting at least a pulsed signal;
- said transmission antenna, which is connected to said signal transmitter;
- a signal receiver capable of receiving at least pulsed signals returned by improvised explosive devices provided with electronic components;
- said reception antenna, which is connected to said signal receiver; and
- a signal control and processing unit, which is connected to said signal transmitter and to said signal receiver.

In addition, said transmission antenna and said reception antenna can be mounted on said orientable block:
- either side by side;
- or in tandem, which reduces the spurious noise caused by the carrier vehicle in the reception antenna, as specified hereinafter.

Furthermore, at least means for directing the firing (gun, antenna) of said neutralisation means are advantageously arranged on said orientable block and are directed (at least in a rest position) toward the zone illuminated by said transmission and reception antennas, thus simplifying the system, which comprises a single orientable block and single means for controlling the orientation of said block.

Moreover, said neutralisation means advantageously comprise:
- a disruptor gun; or
- a microwave generator coupled to an orientable antenna.

In addition, said detection means advantageously further comprise means for adjusting the fundamental frequency of the signal in order to select a fundamental frequency, the exact harmonic of which is not present in the operating environment.

The present invention further relates to a movable device comprising means for combating improvised explosive devices.

According to the invention, said movable device is noteworthy in that said combating means comprise the integrated system for combating improvised explosive devices specified above.

In a first (preferred) embodiment, said movable device is a land vehicle (that is to say moving on the ground). In this case, said block of the integrated system is preferably mounted on the roof of said land vehicle and is arranged and controlled so as to carry out a scan of the ground in front of said land vehicle.

Furthermore, said movable device advantageously comprises means for transmitting a warning signal when the current speed of said land vehicle exceeds a reference speed that depends on the scanning speed of said detection means. This allows efficient detection to be provided by providing a reference speed that prevents the presence of non-scanned zones in front of the land vehicle. It is also possible to provide an alarm warning an operator in the event that the speed is exceeded.

In a second embodiment, said movable device is a helicopter and the block of said integrated system is mounted underneath said helicopter and is arranged and controlled so as to carry out a scan of the ground when the helicopter is flying (at low altitude).

The figures in the appended drawings will aid understanding of how the invention can be carried out. In these figures, identical references designate similar elements.

FIG. 1 is the block diagram of a system according to the invention.

Figure 2:
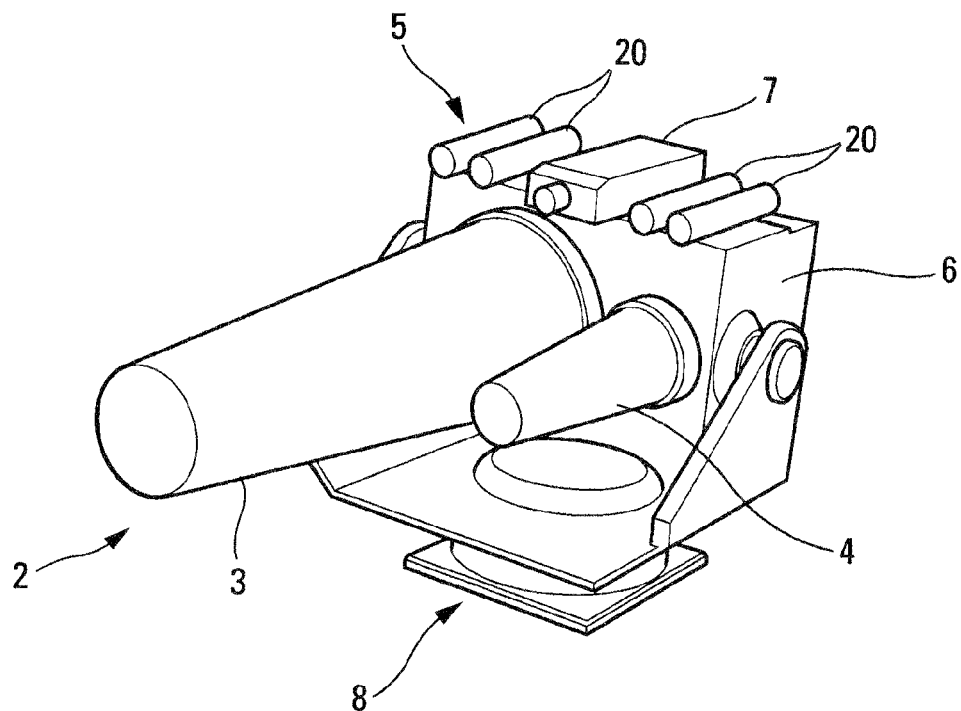

FIG. 2 schematically shows an orientable block of a system according to the invention.

Figure 3:
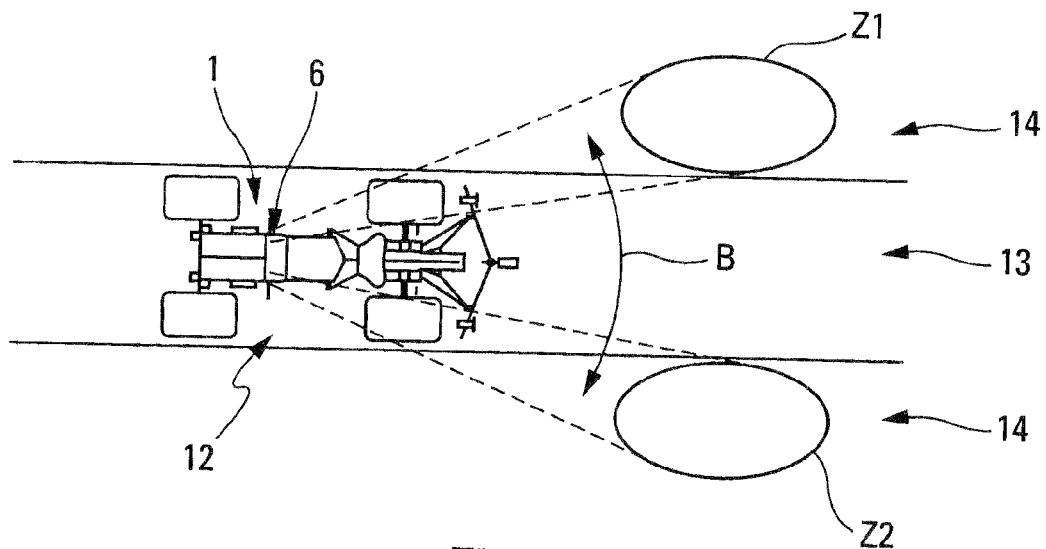

FIG. 3 schematically shows a vehicle carrying a system according to the invention.

The system 1 according to the invention, which is schematically shown in FIG. 1, is an integrated system for combating improvised explosive devices (IEDs) provided with electronic components.

Said system 1 is more particularly, but not exclusively, intended to combat IEDs laid by terrorists in zones of armed forces interventions in overseas theatres of operations and particularly IEDs laid at the sides of a road or IEDs laid or buried at a low depth on a road or a track used by military vehicles.

For this purpose, said system 1 comprises means 2 for remotely detecting electronic components, provided with a transmission antenna 3 and a reception antenna 4, as well as means 5 for neutralising improvised explosive devices.

According to the invention, said system 1 further comprises, as shown in FIG. 2:
- a block 6 that can be oriented in elevation and in bearing and in which at least the following are mounted:
  - the transmission and reception antennas 3 and 4 of said detection means 2, which are directed so as to illuminate a same zone Z1, Z2 of the ground (FIG. 3); and
  - a detection confirmation video camera 7 that is directed toward the zone Z1, Z2 illuminated by said transmission and reception antennas 3 and 4 so as to be able to form an image of this zone Z1, Z2; and
- means 8 for controlling the orientation of said orientable block 6, which cause a displacement of said orientable block 6 so as to generate a scan of part of the ground by said detection means 2. This scan, which is implemented between two extreme positions shown by the zones Z1 and Z2, is indicated by a double arrow B in FIG. 3.

In this way, by virtue of the invention, a detection can be confirmed easily and simply using the confirmation camera 7, as specified hereinafter.

Furthermore, as this detection confirmation camera 7 is directed toward the zone Z1, Z2 illuminated by said transmission and reception antennas 3 and 4 and forms an image of this zone Z1, Z2, it is not necessary for orientation calculations and significant adjustments to the aiming of the camera 7 to be carried out in order to carry out the confirmation, which thus can be implemented quickly. In addition, the image formed by the camera 7 allows a detected IED to be precisely located.

In order to increase speed and precision, said detection confirmation camera 7 is preferably directed toward the centre of the zone Z1, Z2 illuminated by said transmission and reception antennas 3 and 4.

Said transmission and reception antennas 3 and 4 and said detection confirmation camera 7 are preferably fixed (in the same orientation) in the block 6. Means for individually adjusting their respective aiming directions can also be provided.

In a preferred embodiment, said system 1 further comprises a man-machine interface 9 that comprises in particular a display screen 10 and adjustment means 11.

This man-machine interface 9 can in particular display, on the display screen 10, the images generated by said detection confirmation camera 7, and it comprises means (f) r example belonging to the means 11) allowing an operator to manually adjust the scale of the display shown on said display screen 10 (so as to modify the zoom of the displayed images).

Said man-machine interface 9 of the system 1 is remote from said orientable block 6, preferably being installed inside a vehicle 12 provided with said system 1.

Furthermore, said detection means 2 are formed so as to detect non-linear junctions of electronic components, which significantly reduces the probability of false alarms. In effect, an analysis of threats has revealed that a vast majority of IEDs that are laid on roads 13 or on roadsides 14 integrate large or small electronic circuits, either for arming them or for triggering them remotely (or via a sensor integrated in the IED). In the zones of engagement envisaged for the system 1, electronic components are rarely present on roads 13 and roadsides 14, and therefore, in the event of the detection of an electronic component, the likelihood that it belongs to an IED is high.

Said detection means 2 represent an active pulsed system of the NLJD (Non-Linear Junction Detector) type and are intended to detect non-linear junctions, whilst allowing the detection of the harmonics returned by non-linear junctions present in any semi-conductor, such as diodes or transistors.

In a preferred embodiment, said detection means 2 comprise:
- a signal transmitter 16 capable of transmitting at least a pulsed signal with a given fundamental frequency;
- said transmission antenna 3, which is connected to said signal transmitter 16;
- a signal receiver 17 capable of receiving at least pulsed signals returned by electronic components, in particular improvised explosive devices;
- said reception antenna 4, which is connected to said signal receiver 17; and
- a signal control and processing unit 18, which is connected to said signal transmitter 16 and to said signal receiver 17.

In addition to a reduced rate of false alarms, this detection of electronic components has the further advantage of allowing a detection distance of several tens of metres, which can be expected from an active pulsed system for detecting the signal reflected by the PN junction of certain components present on electronic boards. In effect, the response of the junction is perfectly predictable:
- a PN junction between two semi-conductors reflects the incident signal exactly at the frequency of the second harmonic of the signal initially transmitted by the transmission antenna 3; and
- a junction between two conducting metals reflects the incident signal on the third harmonic of the initially transmitted signal.

The detection of an electronic component comprising a semi-conductor junction is effective as soon as the receiver 17 transmits a signal to the signal processing unit 18 with a signal-to-background noise ratio that is higher than a predetermined threshold, typically 20 db.

The fundamental frequency transmitted by pulses by the transmission antenna 3 is selected so that its exact harmonic is not present in the operating environment. In order to fulfil this operational requirement, the detection means 2 further comprise means for adjusting the fundamental frequency of the signal, which form, for example, part of the means 11.

In particular, in order for said detection means 2 to detect components at a distance that ensures the safety of the carrier, said means have the following features:
- high transmission power, in the order of 1 kW;
- transmission and reception electronics designed with a very low noise level; and
- an ultra-sensitive and highly directive pair of transmission and reception antennas 3 and 4.

The transmission and reception antennas 3 and 4 are designed to be as directive as possible and not to be the source of the generation of harmonics that can disrupt the operation of the detector.

In addition, said transmission antenna 3 and said reception antenna 4 are mounted on said orientable block 6:
- either side by side, as shown in FIG. 2;
- or in tandem, that is to say one behind the other (at a sufficient distance from each other).

In a tandem assembly (not shown), the reception antenna mounted at the front cannot carry out scanning but can have a wider lobe. In this case, only the transmission antenna carries out a scan, which reduces the spurious noise caused by the carrier vehicle in the reception antenna.

As shown above, said system 1 further comprises means 5 intended to neutralise (that is to say to destroy or put out of operation) any previously detected and located IED. At least means for directing the firing (gun, antenna) of said neutralisation means 5 are also arranged on the orientable block 6. These means are preferably directed toward the zone illuminated by said transmission and reception antennas 3 and 4, which facilitates the neutralisation. Alternatively or additionally, it is possible to provide specific means for carrying out very precise aiming of the neutralisation means 5.

In a particular embodiment, said neutralisation means 5 comprise disruptor guns 20.

Preferably, such a gun is of the type used with manual aiming by parcel bomb task forces. It has, for example, a 40 mm calibre and it fires projectiles made from soft material, which are crushed upon impact with the structure of the IED and transfer all of the kinetic energy thereto. The level of the impact is such that it dismantles the components of the IED (electronic boards, batteries, wires and fuses), and the IED is then neutralised without having operated. Nevertheless, even if the IED is activated by the impact, the explosion occurs a significant distance from the vehicle 12 carrying the system 1, which is not damaged.

In a further embodiment (not shown), said neutralisation means 5 comprise a high-power microwave generator, coupled to a (phase scanning) antenna which can be mechanically aimed or controlled. This high-power microwave generator allows the electronics of the detected IED to be destroyed remotely.

The operation of the system 1 according to the invention, which is shown schematically in FIG. 1, is as follows:
- during the displacement of the vehicle 12 carrying the system 1, the means 2 for remotely detecting electronic components scan the ground in front of said vehicle 12, illuminating a zone of space (between Z1 and Z2) in order to remotely detect electronic components that can be part of IEDs;
- in the event of a detection (preferably indicated by a visual and/or audible alarm) the image of the zone illuminated at the time of the detection is displayed on the display screen 10 in the cabin of the vehicle 12 by means of the video camera 7 which is linked to the movement of the two transmission and reception antennas 3 and 4;
- the vehicle 12 then stops and once the vehicle has stopped the operator zooms the camera 7 to the relevant zone and directly controls it in order to visually examine the source of the alarm, before deciding whether or not to deal with the object that is the source of this alarm;
- if the presence of an IED is proven or suspected it is neutralised by an operator using the neutralisation means 5.

The technologies used to implement the aforementioned functions preferably have homogenous performance levels in terms of range.

A system 1 according to the invention has the following features in particular:
- a range of several tens of metres, ensuring the safety of the carrier in relation to the effective radius of the charges, which is increasingly high;
- detection reliability with a low false alarm probability; and
- high destruction reliability with an effect that can be observed remotely.

As indicated above, the system 1 according to the invention for combating improvised explosive devices is mounted on a movable device.

In a first preferred embodiment, shown schematically in FIG. 3, said movable device is a land vehicle 12 (that is to say moving on the ground). In this case, the block 6 of said system 1, which can be oriented in elevation and in bearing, is preferably mounted on the roof of said land vehicle 12.

Furthermore, the two antennas 3 and 4 are oriented in a negative elevation and said block 6 is arranged and controlled so as to bring about a scan of the ground several tens of metres in front of said land vehicle 12.

In order to provide efficient detection, the scanning speed of the detection means 2 and the speed of the vehicle 12 need to be selected so that the scan of the sector scanned in front of the vehicle 12 prevents the occurrence of non-scanned zones between two successive scans.

Preferably, the system 1 scans the zone in front of the vehicle 12 at a constant angular speed, with which the maximum speed of advance of said vehicle 12 is servo-controlled. It is also possible to provide an alarm to warn an operator when this maximum speed is exceeded.

Furthermore, in a second embodiment (not shown), the block 6 of said system 1 is mounted under the belly of a helicopter and is arranged and controlled so as to carry out a ground scan, underneath and in front of the helicopter, when said helicopter is flying at low altitude, particularly during a route surveillance mission.

The invention claimed is:

1. A movable device comprising:
   (a) a combating system for combating improvised explosive devices, wherein said combating system comprises an integrated system for combating improvised explosive devices provided with electronic components, said integrated system comprising:
      a detection unit configured to remotely detect electronic components, said detection unit including at least a transmission antenna and a reception antenna by detecting non-linear junctions of electronic components;
      an orientable block having the transmission and reception antennas of said detection unit mounted thereto to illuminate at least a same zone of space, said orientable block being displaceable to generate a scan of apart of space by said detection unit;
      a neutralization unit configured to neutralize improvised explosive devices;
      a detection confirmation camera mounted to said orientable block and directed toward the zone illuminated by said transmission and reception antennas so as to be able to form an image of said zone; and
      a display having a display screen configured to display the images generated by said detection confirmation camera, and an adjuster that manually adjusts the scale of the display shown on said display screen to modify zoom of the displayed images, said display screen and said adjuster being positioned remote from said orientable block, and
   (b) a transmitter configured to transmit a warning signal when the current speed of the land vehicle exceeds a reference speed that depends on the scanning speed of said detection unit.

2. The movable device according to claim 1, wherein said detection confirmation camera is directed toward the centre of the zone illuminated by said transmission and reception antennas.

3. The movable device according to claim 1, wherein said transmission antenna and said reception antenna are mounted side by side on said orientable block.

4. The movable according to claim 1, wherein said transmission antenna and said reception antenna are mounted in tandem on said orientable block.

5. The movable device according to claim 1, wherein said transmission and reception antennas and said detection confirmation camera are fixed in said orientable block.

6. The movable device according to claim 1, wherein said detection unit comprises:
   a signal transmitter configured. to transmit at least a pulsed signal;
   a signal receiver configured to receive at least pulsed signals returned by improvised explosive devices provided with electronic components; and
   a signal control and processing unit, which is connected to said signal transmitter and to said signal receiver, wherein:
   said transmission antenna is connected to said signal transmitter and said reception antenna is connected to said signal receiver.

7. The movable device according to claim 6, wherein said detection unit further comprises an adjuster that adjusts the fundamental frequency of the pulsed signal to select a fundamental frequency, the exact harmonic of which is not present in an operating environment.

8. The movable device according to claim 1, wherein said detection unit further comprises an adjuster configured to adjust the frequency of the signal.

9. The movable device according to claim 1, wherein said neutralisation unit comprises a disruptor gun.

10. The movable device according to claim 1, wherein said neutralisation unit comprises a microwave generator coupled to an orientable antenna.

11. The movable device according to claim 1, wherein said movable device is a and vehicle, and said block of said integrated system is mounted on the roof of said land vehicle and is arranged and controlled so as to carry out a scan of the ground in front of said land vehicle.

12. The movable device according to claim 1, wherein said movable device is a helicopter, and said block of said integrated system is mounted underneath said helicopter and is arranged and controlled so as to carry out a scan of the ground when the helicopter is flying.

13. The movable device according to claim 1, wherein said detection unit is configured to remotely detect non-linear junctions of the electronic components.

14. The movable device according to claim 1, wherein said further comprising a direction unit that directs firing of said neutralization unit, the direction unit being arranged on said orientable block and directed at least in a rest position toward the zone illuminated by said transmission and reception antennas.

* * * * *